US011348412B1

(12) United States Patent
Harris

(10) Patent No.: US 11,348,412 B1

(45) **Date of Patent: *May 31, 2022**

(54) GAMES AND GAMING MACHINES HAVING WHEEL FEATURES

(71) Applicant: Ronnie W. Harris, Las Vegas, NV (US)

(72) Inventor: Ronnie W. Harris, Las Vegas, NV (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/861,489

(22) Filed: Apr. 29, 2020

Related U.S. Application Data

(63) Continuation of application No. 16/518,096, filed on Jul. 22, 2019, now Pat. No. 10,643,435, which is a continuation of application No. 15/154,013, filed on May 13, 2016, now Pat. No. 10,366,578, which is a continuation of application No. 14/591,814, filed on Jan. 7, 2015, now Pat. No. 9,342,954, which is a continuation of application No. 13/913,651, filed on Jun. 10, 2013, now Pat. No. 8,932,125, which is a continuation-in-part of application No. 12/984,441, filed on Jan. 4, 2011, now Pat. No. 8,460,082.

(60) Provisional application No. 61/335,640, filed on Jan. 7, 2010.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| *A63F 5/04* | (2006.01) |
| *G07F 17/34* | (2006.01) |

(52) U.S. Cl.
CPC ............ *G07F 17/329* (2013.01); *A63F 5/045* (2013.01); *G07F 17/326* (2013.01); *G07F 17/3244* (2013.01); *G07F 17/34* (2013.01)

(58) Field of Classification Search
USPC ...................... 463/13, 17, 19, 21, 25, 40, 42
See application file for complete search history.

(56) References Cited

U.S. PATENT DOCUMENTS

| | | | |
|---|---|---|---|
| 5,292,127 | A | 3/1994 | Kelly et al. |
| 5,318,298 | A | 6/1994 | Kelly et al. |
| 5,409,225 | A | 4/1995 | Kelly et al. |
| 5,584,763 | A | 12/1996 | Kelly et al. |
| 5,700,007 | A | 12/1997 | Kelly et al. |
| 5,722,891 | A | 3/1998 | Inoue |
| 5,743,523 | A | 4/1998 | Kelly et al. |
| 5,788,573 | A | 8/1998 | Baerlocher et al. |
| 5,848,932 | A | 12/1998 | Adams |
| 5,967,514 | A | 10/1999 | Kelly et al. |
| 6,089,978 | A | 7/2000 | Adams |
| 6,244,595 | B1 | 6/2001 | Kelly et al. |

(Continued)

*Primary Examiner* — Adetokunbo O Torimiro

(74) *Attorney, Agent, or Firm* — Weide & Miller, Ltd.

(57) ABSTRACT

Gaming machines and games are configured with one or more wheel events or features. The wheel events or features may comprise main games or bonus games, or may comprise entertaining representations of outcomes of other games or events. The wheel events comprise the selection of one or more segments of a wheel having associated awards. Wheel events may have various entertaining configurations, such as morphing wheels, symbols that reveal awards and the like.

20 Claims, 3 Drawing Sheets

(56) References Cited

U.S. PATENT DOCUMENTS

| | | | |
|---|---|---|---|
| 6,334,814 | B1 | 1/2002 | Adams |
| 6,446,964 | B1 | 9/2002 | Kelly et al. |
| 6,491,296 | B2 | 12/2002 | Kelly et al. |
| 6,533,273 | B2 | 3/2003 | Cole et al. |
| 6,612,574 | B1 | 9/2003 | Cole et al. |
| 6,612,575 | B1 | 9/2003 | Cole et al. |
| 6,663,488 | B1 | 12/2003 | Adams |
| 6,692,355 | B2 | 2/2004 | Baerlocher et al. |
| 6,827,646 | B2 | 12/2004 | Adams |
| 7,011,581 | B2 | 3/2006 | Cole et al. |
| 7,100,916 | B2 | 9/2006 | Kelly et al. |
| 7,235,011 | B2 | 6/2007 | Randall et al. |
| 7,278,635 | B2 | 10/2007 | Kelly et al. |
| 7,311,598 | B2 | 12/2007 | Kaminkow et al. |
| 7,322,886 | B2 | 1/2008 | Manz |
| 7,390,257 | B2 | 6/2008 | Paulsen et al. |
| 7,442,125 | B2 | 10/2008 | Paulsen et al. |
| 7,618,316 | B2 | 11/2009 | Cole et al. |
| 7,641,554 | B2 | 1/2010 | Paulsen et al. |
| 7,729,074 | B2 | 6/2010 | Venkataramani et al. |
| 8,460,082 | B2 | 6/2013 | Harris |
| 8,932,125 | B1 | 1/2015 | Harris |
| 8,956,213 | B2 | 2/2015 | Manz et al. |
| 2002/0042294 | A1 * | 4/2002 | Pau .................... G07F 17/3262 463/16 |
| 2005/0059471 | A1 | 3/2005 | Cannon |
| 2005/0119039 | A1 | 6/2005 | Berman et al. |
| 2005/0119042 | A1 | 6/2005 | Chamberlain et al. |
| 2006/0009278 | A1 | 1/2006 | Vancura |
| 2006/0033268 | A1 | 2/2006 | Wong |
| 2007/0054723 | A1 | 3/2007 | Mattice et al. |
| 2007/0060239 | A1 | 3/2007 | Nelson |
| 2007/0072668 | A1 * | 3/2007 | Hein .................... G07F 17/323 463/16 |
| 2007/0117608 | A1 | 5/2007 | Roper et al. |
| 2008/0146309 | A1 | 6/2008 | Bennett |
| 2009/0075715 | A1 | 3/2009 | Coleman et al. |
| 2011/0218027 | A1 | 9/2011 | Manz et al. |
| 2012/0122545 | A1 | 5/2012 | Watkins et al. |

* cited by examiner

GAMES AND GAMING MACHINES HAVING WHEEL FEATURES

RELATED APPLICATION DATA

The present application is a continuation of application Ser. No. 16/518,096, filed Jul. 22, 2019, which is a continuation of application Ser. No. 15/154,013, filed May 13, 2016, now U.S. Pat. No. 10,366,578, which is a continuation of U.S. patent application Ser. No. 14/591,814, filed Jan. 7, 2015, now U.S. Pat. No. 9,342,954, which is a continuation of U.S. patent application Ser. No. 13/913,651, filed Jun. 10, 2013, now U.S. Pat. No. 8,932,125, which is a continuation-in-part of U.S. patent application Ser. No. 12/984,441, filed Jan. 4, 2011, now U.S. Pat. No. 8,460,082, which claims priority to U.S. Provisional Patent Application Ser. No. 61/335,640, filed Jan. 7, 2010, which prior applications are incorporated by reference herein in their entirety.

FIELD OF THE INVENTION

The present invention relates to wheel-type features for games and gaming machines.

BACKGROUND OF THE INVENTION

Various gaming machines and games include spinning wheel features. The wheel features may comprise a physical rotating reel or a video representation of a wheel. Because spinning reels have such great appeal, various gaming machines and wagering games have been developed which include such a feature.

Relative to gaming machines, the most common implementation of a spinning wheel is a bonus wheel feature. In this implementation, a gaming machine is configured to present a base game. Such a game might comprise a slot game. The slot game may have various winning outcomes with associated base awards. Certain outcomes may trigger activation of a bonus or secondary wheel. The bonus wheel may offer a bonus award in addition to a base award. Generally, the bonus wheel has a plurality of spaces or "slices", each of which bears a potential bonus award. The wheel spins and randomly stops at one of the spaces, thus resulting in a randomly selected bonus award for the player.

Game players continually seek new and exciting games. These games peak player interest, and thus also increase revenue for casinos. Thus, while existing spinning wheel game features are popular, they are old and not as exciting as they might be.

SUMMARY OF THE INVENTION

The invention comprises wheel features or events particularly suited for use with gaming machines and games. In one embodiment, the wheel features or events of the invention comprise wagering games, bonus events or are used to represent game outcomes.

The wheel features or events may be represented by the video display of wheel events or by use of mechanical and/or electro-mechanical wheels. For example, a gaming machine might include one or more displays for displaying a base game, such as a main video display or reels. The gaming machine might also include a secondary video display for displaying wheel events and/or a physical wheel.

The wheel events of the invention may have various forms. Wheels may be used in various manners to display outcomes, such as credit awards. One or more wheels might bear various indicia or symbols, such as credit awards, multipliers, colors, free spins, free games, jackpot wins or the like. The configuration of the wheel may vary, including during play. In addition, the symbols or awards may vary, including during play.

In a preferred embodiment, the wheel features are used as an entertaining display of all or part of an outcome of a bingo game. One or more bingo game outcomes are designated as winning outcomes. At least one winning outcome might comprise a game-ending winning outcome. At least one winning outcome may be an interim winning outcome, meaning that it does not end the game. The winning outcomes may comprise bingo card matching patterns. One or more awards may be associated with the winning outcomes, such as a number of credits. The winning outcomes and associated awards may be defined by a pay table for the bingo game. In one embodiment, a winning outcome may be represented wholly or in part by a wheel event.

The game may be implemented via an electronic gaming machine, such as in a gaming system including gaming machines linked to a central server. In such embodiments, bingo cards may be electronically displayed. However, the game might be implemented utilizing printed bingo cards. Further, principles of the invention may be applied to other games.

Further objects, features, and advantages of the present invention over the prior art will become apparent from the detailed description which follows, when considered with the figures provided herein.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises wheel events or features and methods of game play ("games") and gaming machines including such wheel events or features. The wheel events or features have applicability to various games and gaming machines. In one preferred embodiment, a wheel event or feature is used as an indicator or representation of a bingo game outcome or win.

Figure 1:
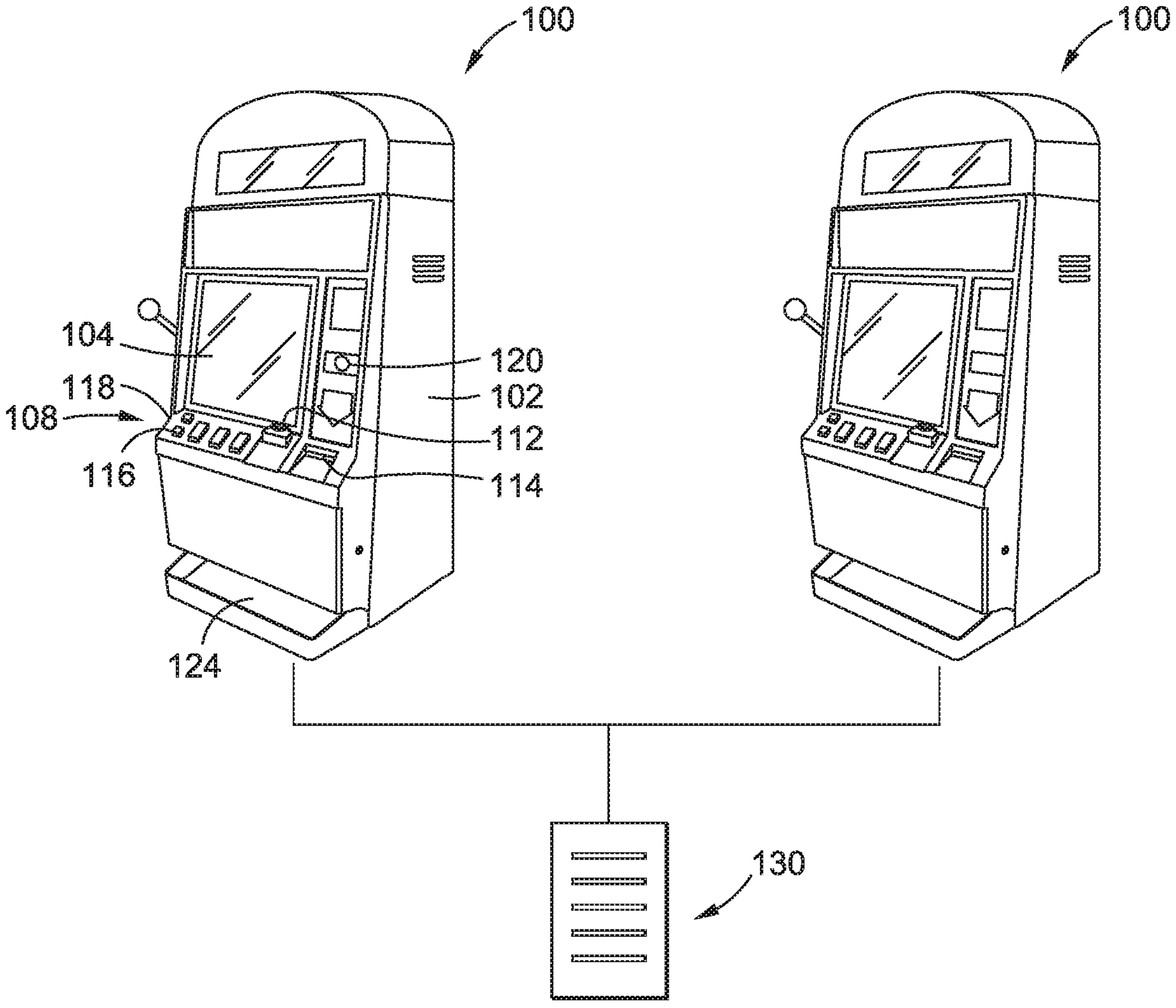
FIG. 1 illustrates gaming machines and a gaming system which may comprise an environment in which wheel features of the invention may be implemented.

FIG. 1 illustrates one embodiment of a gaming machine or device 100 which may be configured to include or present a wheel event or feature of the invention and at which a game having a wheel event or feature may be implemented. The gaming machine 100 might be located in various environments, such as a casino.

In one embodiment, the gaming machine 100 defines a generally enclosed interior space for housing one or more components. As illustrated, the gaming machine 100 generally comprises a housing or cabinet 102 for supporting and/or enclosing various components required for operation of the gaming machine. In the embodiment illustrated, the housing 102 includes a door located at a front thereof, the door capable of being moved between an open position which allows access to the interior, and a closed position in which access to the interior is generally prevented. The configuration of the gaming machine 100 may vary. In the embodiment illustrated, the gaming machine 100 has an "upright" configuration. However, the gaming machine 100 could have other configurations, shapes or dimensions (such as being of a "slant"-type, "bar-top" or other configuration as is well known to those of skill in the art).

The gaming machine 100 preferably includes at least one display device 104 configured to display game information. The display device 104 may be a mechanical, electro-mechanical or electronic display, such as one or more rotating reels, a video display or the like. When the display device 104 is an electronic video display, it may comprise a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display 104 may be capable of projecting or displaying a wide variety of information, including images, symbols and other indicia or information associated with game play, game promotion or other events. As detailed below, the gaming machine 100 may include one or more second or secondary display devices. Such might be associated with the housing or cabinet 102 with the main display device 104, or be associated with a top box or the like, as illustrated in FIG. 1.

The gaming machine 100 may be configured to present a wide variety of games. In a preferred embodiment, the game may be a bingo or bingo-based game. However, the games might be other types of games such as, but not limited to, Class III type games such as slot games and video poker games, or other Class II type games such as pull-tab games, lotto or instant lottery style games. In one embodiment, certain game outcomes may be designated as winning outcomes. Prizes or awards may be provided for winning outcomes, such as monetary payments (or representations thereof, such as prize of credits), or the like. As detailed below, one or more of the awards may have certain characteristics or features.

The gaming machine 100 also preferably includes one or more player input devices 108 (such as input buttons, plunger mechanisms, a touch-screen display, joystick, touch-pad or the like) that may be utilized by the player to facilitate game play. Also included in the player input devices 108 is a means for accepting monetary value. As illustrated in FIG. 1, a coin accepting mechanism 112 may be provided for accepting coins and a currency or bill acceptor 114 may be provided for accepting cash or paper currency, or a ticket reader may be provided for accepting and reading tickets or other representations of cash or currency. It is contemplated that other mechanisms may be provided for accepting a payment, such as credit card, ticket readers or input devices whereby a player may have funds paid from a remote account.

In one preferred embodiment, the gaming machine 100 includes a microprocessor or controller (not shown) for controlling the gaming machine, including receiving player input and sending output signals for controlling the various components of the machine 100 (such as generating game information for display by the display 104). The controller may be arranged to receive input such as a purchase/bet signal when a purchase/bet button is depressed, and a currency insert signal when a player inserts bills or coins. The controller may be arranged to send signals for determining winning combinations, for causing the coin hopper/dispenser to pay winnings, and to cause the display to display winning amount information. In addition, the controller is preferably arranged to determine if a round of game play has resulted in a win, and if so, the prize to be awarded to the player for that win.

The controller may be configured to execute machine readable code or "software" or otherwise process information, such as obtained from a remote server. Software or other instructions may be stored on a memory or data storage device. The memory may also store other information, such as pay table information. The gaming machine 100 may also include one or more random number generators for generating random numbers for generating random game outcomes, or such might be located remotely. For example, if the gaming machine 100 is a stand-alone machine configured to present a slot game or a video poker game, the random number generator(s) might be located at the machine. However, if the gaming machine 100 is used to present server-based or networked games, such as bingo games, the random number generator(s) might be located at the server.

In operation, the player may initiate game play by providing value. In the case of a bingo game, this may comprise purchasing one or more bingo cards. In other types of games, this may comprise placing a wager. The purchase or wager is made by activating one of the player input devices 108 such as a one credit button 116 which places a single credit purchase or wager or a max credit button 118 which places a maximum purchase or wager for that round of game play. The maximum purchase or wager is commonly defined as playing or betting an amount comprising a multiple of the value of a single purchase or wager up to a predefined upper purchase or bet limit or threshold. When the player actuates either the one credit button 116 or the max credit button 118, a wager is placed or purchase is made in that amount and the player's credit base is decreased by the number of credits wagered. The player's remaining credit base is typically displayed to the player by way of the display device 104. Upon making a purchase or placing a wager, the game may begin automatically or the player may join a game already in progress, or the player may initiate the game by activating another player input device, upon which the gaming machine 100 presents one or more game elements which are used to determine if the player has received a winning combination.

The gaming machine 100 generally includes a means for awarding a player a prize or winnings accumulated during game play. When a player obtains a winning outcome, the player is preferably paid prizes or awards in the form of stored credits, the amount of which is indicated to the player on the display 104. A "cash out" button may be provided for permitting a player to be paid the winnings or redeeming any credits initially paid into the gaming machine 100. The term "cash out" is used herein to define an event initiated by the player wherein the player receives a number of coins or currency that is equivalent to the value of the player's accrued credit base.

Typically when a player cashes out, the gaming machine 100 is configured to dispense a media or voucher, such as via a printer 114, which represents the cash-out value. The player may utilize this voucher at other gaming machines or convert the voucher to currency, such as at a cashier's station. However, depending upon the configuration of the gaming machine 100, the player might receive a cash or coin disbursement. For example, the gaming machine 100 might be configured to activate a coin hopper or coin handling device (not shown) which physically counts and delivers the proper number of coins to the player. The coin handling device is commonly configured to transport coins from a supply source (hopper or bin filled with coins) to a coin tray 124 or payout receptacle where the player physically receives the coins.

As indicated above, the gaming machine 100 may be configured as a stand-alone device, such as when the machine is configured to present a slot game or a video poker game. In other instances, however, the gaming machine 100 may be a server-based or networked machine. For example, the gaming machine 100 may be configured to obtain game code or game outcome information from a remote server. The gaming machine 100 may also communicate with a remote accounting server and/or player tracking server, as is well known in the art. As indicated below, a preferred embodiment of the invention is a bingo game which involves two or more players. In such a game, each player may play the bingo game on a different gaming machine 100. Each gaming machine 100 may communicate with a central server 130. The central server 130 may generate game information which is provided to the gaming machines 100 which are in communication therewith.

It will be appreciated that the gaming machine and system described and illustrated in FIG. 1 is only exemplary of an environment for a game of the invention. For example, it is possible to implement the wheel events or features via other types of gaming devices, such as hand-held devices and computing devices such as home and laptop computers, including in an on-line, web-based environment. It is also possible to implement the game in non-electronic environments. For example, relative to a bingo game, physical printed cards could be distributed to players.

In accordance with the invention, the gaming machine 100 may be configured to implement or include a wheel event or feature. The wheel event may be presented in various manners. In one embodiment, the gaming machine 100 may include one or more physical wheels, or it might be configured to display a video or electronic representation thereof, either via the main display or one or more secondary video displays. For example, the gaming machine 100 might include the main display 104, such as for displaying bingo game information. The gaming machine 100 might also include a wheel or a second video display for displaying a video representation of a wheel. As illustrated in FIG. 1, such a secondary video display might be located in a top box, whereby main game information is shown on the main display 104 and the wheel event is shown via the top box display. In another configuration, the main display 104 of the gaming machine 100 might be configured to display main game information, such as bingo game information, and at one or more times, a video representation of a wheel.

In the description below, various wheel events or features will be described primarily with reference to a video representation or implementation. It will be appreciated, however, that various of the features thereof may be implemented in a mechanical or electro-mechanical wheel format.

Figure 2A:
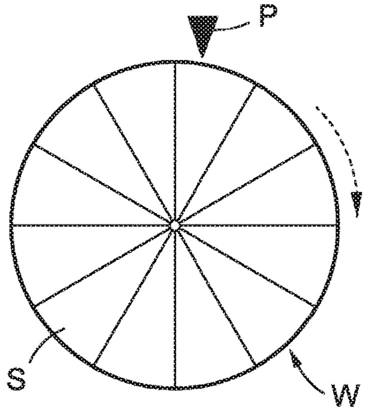
FIGS. 2A and 2B illustrate various wheel events or features in accordance with the invention.
Figure 2B:
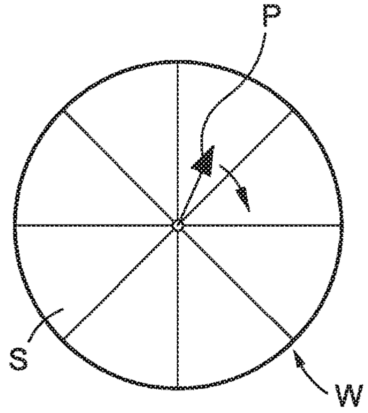

In one embodiment of the invention, as illustrated in FIG. 2A, one or more wheels are used to indicate one or more awards. For example, a wheel W might be divided into a plurality of segments or spaces S. The number and shape of those spaces S may vary. Preferably, the outcome of a wheel event is the selection of one or more of the spaces and an award associated therewith. Preferably, the selection is illustrated or represented by motion or movement and then the cessation of such motion or movement. For example, a selection event might comprise the wheel spinning and then stopping relative to a pointer P as indicated in FIG. 2A, or the movement and then stopping of a pointer P relative to the wheel W as illustrated in FIG. 2B (the pointer might comprise a physical element or displayed element, and might also comprise highlighting or other manner of displaying a selected segment). The segment which aligns with the pointer when the wheel or pointer stops moving may be deemed to be a selected segment. In some embodiments, more than one segment may be selected. Of course, when the wheel is a video representation, the movement of the wheel, pointer or the like is represented graphically via the video display.

At one or more times, the segments of the wheel preferably bear or display one or more indicia, symbols or attributes. The indicia or symbols are preferably used to designate various awards, as detailed below. The awards might be displayed directly or might be indicated by reference. For example, awards might comprise credit or win values (such as 2 credits, 500 credits, etc.); jackpot symbols; multiplier values; additional free spins of the wheel(s); one or more free games (for play of the base game); or other cash, prizes, etc.

Figure 3A:
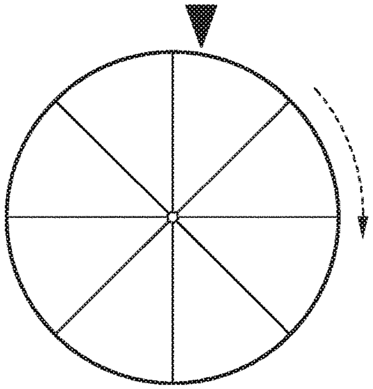
FIGS. 3A, 3B and 3C illustrate various wheel events or features in accordance with the invention.
Figure 3B:
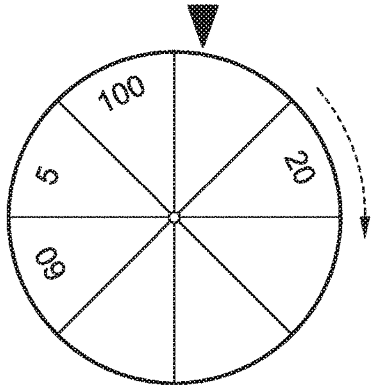
Figure 3C:
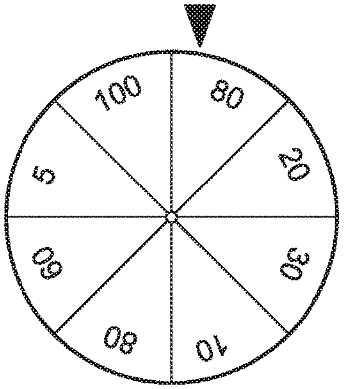

In one embodiment, a wheel may be displayed to a player that initially has empty segments or spaces, as illustrated in FIG. 3A. Awards may be associated with the wheel once the wheel (or pointer, etc.) begins spinning, as illustrated in FIG. 3B. Those awards might comprise various of the awards detailed herein or others, such as credit values, free spins, etc. One or more spaces of the wheel (some or all) may be filled before the wheel outcome is displayed (i.e. before the wheel, pointer, etc. stops spinning), as illustrated in FIG. 3C.

In another variation, a player may be permitted to select one or more awards, values, indicia or other wheel segment attributes. As one example, a wheel may be displayed to a player that initially has one or more or all empty segments or spaces (e.g. all of the segments of the wheel might be empty or only some of them might be empty while others are already filled). The player may then be permitted to select one or more attributes for association with one or more of those empty segments or spaces. While the one or more segments might be entirely empty, in some embodiments a segment may be treated as empty because it displays a placeholder symbol, color or other element which is not a selection event attribute (for example, where a wheel selection event comprises selection of a wheel segment having an associated displayed credit value, a segment may be treated as "empty" when it initially displays a casino logo symbol (i.e. even though the segment displays such a logo and is not truly empty, the segment is treated as empty because it does not display a credit value).

In one configuration, a player might select objects or elements which hide wheel attributes. For example, a wheel might have three empty segments and a player might be presented with 10 boxes, each having an associated hidden attribute. The player might select 3 of the 10 boxes; where in the attributes associated with those boxes are associated with the empty wheel segments.

In another embodiment, a player might select attributes from a set of attributes. For example, a wheel might have three empty segments and a player might be presented with the following set of attributes, from which the player selects three attributes: free spin, 100 credits, 10 credits, mystery bonus, and 50 credits.

In another embodiment, a player might be presented with sets or groups of attributes and might be permitted to select one of the sets. For example, a wheel might have three empty segments and the player might be presented with a first set of attributes comprising 100 credits, 50 credits and 100 credits, and a second set of attributes comprising 1000 credits, 2 credits and 5 credits. The player would select one of the two sets of attributes and the associated attributes/awards would be associated with the wheel segments. In this example, one player might opt for the first set of attributes which guarantees no less than a 50 credit win, while another player might opt for the second set of attributes which presents the option for a 1000 credit win (even though the player might only win 2 credits).

The attributes used in the selection process might be randomly generated or might be based upon game outcomes or player activity. For example, attributes which are associated with boxes or other elements might be randomly generated and assigned to those boxes/elements. As another example, the size of a player's wager might determine which sets of attributes a player may select from. The attributes in different sets might have higher maximum values or higher average values in certain instances. It will also be appreciated that the attributes which are used to play the game may vary (such as comprising various types of awards or representations thereof, such as credit values, monetary values or other types of prizes (food/goods/entertainment), free game play or other types of game awards, etc.).

Figure 4A:
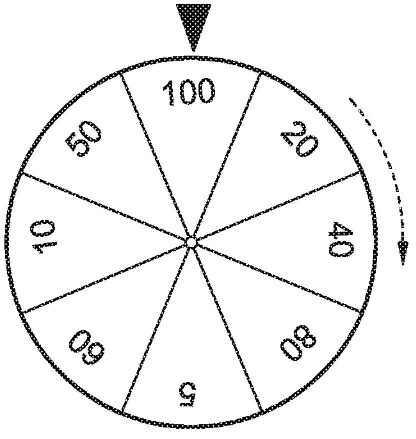
FIGS. 4A and 4B illustrate various wheel events or features in accordance with the invention.
Figure 4B:
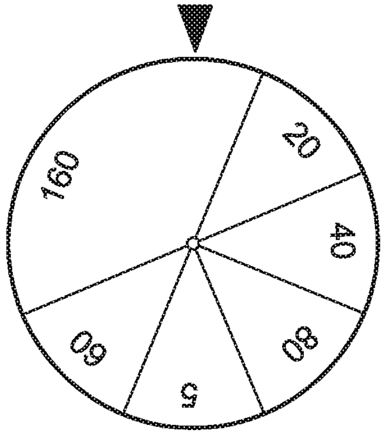

In another embodiment, one or more segments of a wheel might merge, morph or otherwise change from a first state to a second state. As one example, a wheel might include one or more segments displaying credit values, as illustrated in FIG. 4A. While the wheel spins or as/when it stops, one or more of those segments might merge together bearing a modified credit value, as illustrated in FIG. 4B. For example, three segments of a wheel might initially display values of 10, 50 and 100 credits. During a particular wheel spin, those segments might merge into a single large segment bearing a credit win of 160 credits (or the new segment might bear a credit amount which is higher or lower than the combined amounts). Because the segments merge into larger segments, the opportunity for receiving that outcome may increase and increasing or enhancing player excitement associated with the event.

In another embodiment, the segments might merge when the wheel stops. Relative to the above example, when the wheel stops the player might have hit the segment bearing the "10 credits" win. One or more adjacent segments may merge or crash into the selected segment and change the original award value, such as by increasing the value of the award. For example, the adjacent segments of 50 and 100 credits may merge, blend or smash into the selected segment, thus again resulting in a higher award indication to the player. As indicated below, this feature may be utilized with other features or aspects of the invention. For example, wheel segments may be populated after the wheel begins to spin and then the segments may merge, or blank segments might merge and then be populated with values.

Figure 5A:
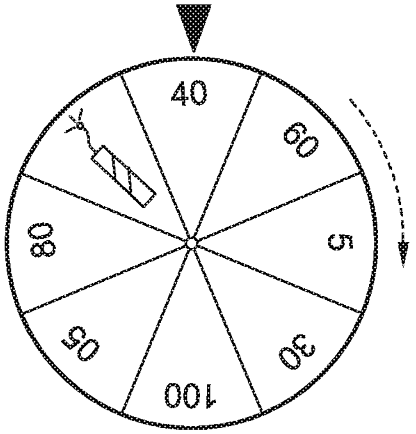
FIGS. 5A and 5B illustrate various wheel events or features in accordance with the invention.
Figure 5B:
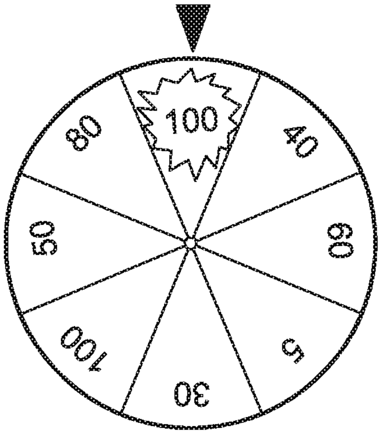

Various wheel outcomes may change or there might be various mechanisms for displaying an outcome. For example, one or more segments of a wheel might display a symbol that itself does not comprise a designated award, as illustrated in FIG. 5A. That symbol might change at one or more times to display an award. For example, a segment of a wheel might display a firecracker symbol. That symbol might change to an award value, such as a number of credits or the like, by changing its configuration. The firecracker might "blow up" in an animated sequence, thus revealing the award, as illustrated in FIG. 5B. The symbol change might occur at various times. Preferably, the award is revealed if the symbol is selected at the outcome of the wheel spin. The symbol change might be associated with other features or events described herein. For example, a symbol change (such as a firecracker blowing up) might cause a merger of one or more segments or the display of a multiplier value or the like.

As indicated, a primary indicia might be associated with one or more portions of a wheel. For example, the primary indicia might comprise an award or a symbol which indicates an award. In another embodiment, the wheel might include one or more secondary indicia. The secondary indicia might comprise colors, symbols or the like. For example, the color of a wheel segment might be used to indicate a multiplier of a primary award. For example, the color red might indicate a multiplier of 2×. If the outcome of a wheel spin was the selection of a red space bearing the primary indicia "100 credits", the player would then be awarded 200 credits. The secondary indicia, such as color, might be associated with the wheel or portions of the wheel at various times. Further, the secondary indicia might change over time. As one example, a wheel might bear primary awards in its segments. When the wheel begins to spin, the color may be associated with the segments and/or the colors of the segments may change. In this manner, the potential outcomes of the wheel spin remains dynamic, changing as the wheel spins and creating greater excitement during the wheel spin. As with the other features of the invention, the color feature might be used in various combinations with features of the invention. For example, color or changes in color might be associated with the merger of segments, etc.

As indicated, the various wheel features may be implemented with various gaming machines and with various games. For example, the wheel events or features could be implemented as a primary game. For example, a player could place a wager and then a wheel could be displayed. A random number generator might select one of the segments or spaces of the wheel and a video representation of the wheel could be displayed wherein the wheel spins and stops at the selected segment. The award corresponding to that segment could then be awarded. The wheel events or features could also be implemented to display bonus outcomes. For example, one or more outcomes or events of a base or main wagering game could trigger a wheel feature or event. Such an event could be used to generate the main game outcome or a bonus outcome in addition to winnings of the main/base game. In a preferred embodiment, the one or more wheel features may be used as an entertaining display of all or a portion of the results of a main game. For example, in one preferred embodiment, a base game may comprise a bingo game. The results of such a game may be displayed by a wheel event or feature of the present invention.

As one example, in a step S1 a player purchases a bingo card or places a wager. As indicated above, such may comprise a player providing a number of credits at a gaming machine. This step might also comprise a player providing monies to an operator. Relative to the game of bingo, a player may be permitted to purchase bingo cards having different values, such as "base" value cards (such as "one credit" cards) or higher value cards, such as "max" value cards (purchased for two or more credits). The particular purchase prices or values of the cards may be determined by the operator.

One or more bingo or game cards are assigned to the player in a step S2. In one embodiment, a player might purchase two or more cards, and such cards may be assigned to the player. The game cards may be provided electronically. For example, relative to the system illustrated in FIG. 1, upon a player placing a wager, the server 130 may assign a game card to a player and transmit game card information to the gaming machine 100 that the player is playing. This game card may be displayed to the player at the gaming machine.

The bingo or other game card may have various configurations. Preferably, the game card bears numbers or other designations. For example, the card might comprise a bingo card having numbers arranged in a 5 by 5 grid (totaling 25 numbers arranged into five rows and five columns). The numbers on the cards might comprise numbers selected from the group of numbers 1-75, which numbers are randomly assigned to the locations of the card. In some embodiments, numbers from the group 1-15 are randomly selected for the 5 spots of the first column, numbers from the group 16-30 are randomly selected for the 5 spots of the second column, etc. for each card. One card could have the numbers 1-75 may be associated with columns designated "B" "I" "N" "G" and "O" and balls or objects may be similarly marked (such as B5; N42, etc.)

In one embodiment, certain criteria may have to be satisfied before a game can be initiated. For example, in a bingo-type game, two or more players may be required before a game can begin. Thus, two or more players may be required to purchase game cards or place wagers before the game begins.

When the game begins, one or more objects which are similarly numbered or designated as the game cards are drawn or selected, as in a step S3. In one embodiment, objects may comprise bingo balls, either in electronic or physical form, which are numbered with the numbers one to seventy-five (1-75). The balls or other objects may be physical objects or may be electronically represented.

In one embodiment, the objects may be selected in one or more sets or "draws". For example, in one embodiment of a game, there is a first single ball draw of thirty (30) numbers or designations which may be represented as balls. In another embodiment, there is a first draw of one (1) number or designation and then a second ball draw of twenty-nine (29) numbers or designations.

In the game of bingo, the numbers or other designations associated with the objects are compared to the numbers or designations on the cards to determine matches and potential wins, as in a step S4. It is noted that the process of matching may require input from the player (such as requiring a player to place a "daub" button), and may be required relative to each group or draw of numbers or designations (for example, the player may be required to "daub" after a first single numbers or designation is drawn and then again after the 29 additional numbers or designations are drawn, relative to the example ball draw indicated above). The comparison may be accomplished automatically or manually. For example, a player might select a "daub" button to affect the gaming machine's marking of all matches of drawn or called numbers or designations to those on each of their cards. In other embodiments, such might occur automatically or the player might be required to mark each match.

In one embodiment, one or more predetermined game outcomes are determined to be winning outcomes. In a game of bingo, the winning outcomes may be particular patterns of matches of the numbers or other designations on a card, such as a diagonal, horizontal or vertical line of player numbers, an "X" pattern or the like. The one or more predetermined winning combinations may have prizes associated therewith, as in the step S4. One or more winning combinations may be deemed "game ending" patterns in that once received, they cause the game to terminate or bring the game to an end, as in a step S5 (the other winning outcomes may be termed "interim" winning outcomes or patterns, since they result in win to the player, but do not end the game). As part of the determination of winning outcomes, associated prizes may be awarded.

Thus, during the course of game play, one or more players may receive interim winning outcomes based upon matches of their card(s) to the one or more initial ball draws. In addition, one or more players might receive the game ending pattern based upon the one or more initial ball draws. As indicated, one or more additional balls may be drawn until a game-ending pattern is received.

In one embodiment of the invention, one or more awards are associated with the designated winning outcomes. In a preferred embodiment, one or more of the awards are represented via a wheel feature. For example, a bingo game outcome might comprise a win of 1000 credits. A wheel may then be displayed on a video display of the bingo game machine. The wheel may have one or more of the features described above. The outcome of the wheel feature or event may be predetermined to be a display of an award of 1000 credits, and thus comprise a display of the amount won playing the bingo game. For example, the wheel event might comprise a spin of a wheel having segments bearing various awards, such as 50, 500, 1000, 2000, etc. The outcome of the wheel spin might comprise selection of the "1000 credits" space.

The wheel feature might be used as a bonus event display of such a predetermined outcome. For example, a bingo game outcome may have as its primary representation a slot game wherein various slot symbols are displayed. In the event one or more particular symbols are displayed, a wheel "bonus" may be activated. For example, the slot symbols may include "wheel bonus" symbols. The slot display may include five reels of symbols arranged in 3 columns. If a wheel bonus symbol appeared anywhere in the first, third and fifth column, the "wheel bonus" might be triggered. That wheel bonus might result in an outcome corresponding to the bingo game win (such as a 1000 credit award).

One example of an implementation of the game will now be described. In one embodiment, the invention may be implemented as a bingo game. In such a game, players may purchase one or more bingo cards. Of course, the format of the bingo card, including the number of player numbers, may vary. The card might be a traditional card of 5 columns each associated with the letters B-I-N-G-O, each column having 5 numbers. As indicated above, in one embodiment, the game preferably does not begin until at least two players purchase cards. However, after the game begins, those same players may purchase additional cards or other players may enter the game by purchasing one or more cards.

Once the game begins, bingo balls which are similarly numbered to the cards are selected. The bingo balls are preferably randomly selected, such as by a game server, by a bingo ball blower or the like. As indicated above, one or more bingo balls may be selected in one or more groups.

Matches of bingo numbers to the player's bingo card may be indicated (such a step may be performed automatically or may be accomplished by the player, such as by daubing the matches or requesting that a gaming machine daub the matches). Prizes may be awarded for any winning outcomes. For example, a prize may be awarded for matching the numbers at two of the corners of the bingo card. Such a winning outcome might comprise an interim winning outcome, whereby the game continues on until a game winning outcome is received. As the game proceeds, additional bingo balls may be drawn and called for matching to the bingo cards which are active in the game.

The player may be awarded winnings for the "two corners" winning outcome. As one example, this award might comprise an award of 100 credits. The award may be represented by a base slot game. This game might include the spinning of reels of symbols. A result of a spin of the symbols might comprise symbols representing 50 credits and a wheel spin. The slot game representation might be presented on a main game display. The wheel might be shown on a secondary video display, such as in a top box above the gaming machine. The player might be prompted via the main display to spin the wheel. Upon input, the wheel might spin. The wheel event preferably results in a displayed award of 50 credits. In this manner, the combined results of the main slot representation and the secondary wheel representation comprises 100 credits. In this manner, these representations convey to the player their 100 credit bingo win via a sequence of entertaining non-bingo events.

Of course, the above represent examples of bingo games and examples of wheel features that may be used with those games. The wheel events or features could be used with other games, including bingo games of other types.

When the game is presented via a gaming machine, such as by the system illustrated in FIG. 1, various of the steps of the invention may be performed by the gaming machine and/or server. For example, the game server may be configured to generate game cards, randomly select balls or game numbers, track and display matches of game numbers to game cards, and confirm whether a player's eligibility for a win. In such a configuration, steps of the game might be implemented via machine readable code which is stored at a memory of the gaming machine and executed by the controller of the gaming machine.

In accordance with the invention, numerous advantages are realized. Most importantly, new and exciting wheel features or events are described. When used in conjunction with a wagering gaming machine or wagering game, these wheel features or events are enticing to players. This has been found to result in greater levels of player play of the games.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A wheel prize selection event for a game comprising the steps of:

graphically displaying on an electronic video display a wheel having a plurality of segments, at least one of the segments initially displaying an icon which does not identify an award;

graphically transforming the icon displayed in the at least one of the segments into an award instead of displaying the icon; and graphically displaying a selection of one of said plurality of segments comprising displaying relative movement of said wheel to a selector and then displaying said selector relative to a selected one of said plurality of segments.

2. The wheel prize selection event in accordance with claim 1 wherein said game is a wagering game.

3. The wheel prize selection event in accordance with claim 2 wherein said electronic video display is a display of a gaming machine.

4. The wheel prize selection event in accordance with claim 1 wherein at least one of said plurality of segments of said wheel initially displays an award.

5. The wheel prize selection event in accordance with claim 1 wherein said step of displaying relative movement of said wheel to a selector comprises displaying rotation of said wheel relative to said selector.

6. The wheel prize selection event in accordance with claim 1 wherein said award comprises one or more of a numerical value, a number of credits, a jackpot, a number of free spins, a number of free spins and a monetary value.

7. The wheel prize selection event in accordance with claim 1 wherein said step of transforming the icon occurs prior to said step of displaying relative movement of said wheel to said selector.

8. The wheel prize selection event in accordance with claim 1 wherein said step of transforming the icon occurs during said relative movement of said wheel to said selector.

9. The wheel event in accordance with claim 1 wherein said step of transforming the icon occurs after the displaying of said selector to a selected one of said plurality of segments.

10. The wheel prize selection event in accordance with claim 9 wherein the icon is transformed in at least one of the plurality of segments in response to the selection of a segment of said plurality of segments which displays said icon.

11. The wheel prize selection event in accordance with claim 1 wherein said wheel prize selection event is presented based upon a designated winning outcome of a bingo game.

12. A gaming machine comprising:

an electronic video display;

at least one player input device;

a memory device;

a controller; and machine-readable code stored in said memory device and executable by said controller to cause said controller to cause the electronic video display to graphically display a wheel prize selection event comprising displaying a wheel having a plurality of segments, at least one of the segments initially displaying an icon which does not identify an award, to graphically display a transformation of the icon displayed in the at least one of the segments into an award, and to graphically display a selection of one of said plurality of segments comprising displaying relative movement of said wheel to a selector and then displaying said selector relative to a selected one of said plurality of segments.

13. The gaming machine in accordance with claim 12 further comprising machine-readable code configured to cause said controller to cause the electronic video display to display base game information and to display said wheel prize selection event when a triggering event occurs in the base game.

14. The gaming machine in accordance with claim 13 further comprising a monetary value accepting device for accepting monetary value for creating a credit balance at said gaming machine and wherein said base game information comprises information regarding a base wagering game presented based upon a wager placed by a player from said credit balance.

15. The gaming machine in accordance with claim 12 wherein at least one of said plurality of segments of said wheel initially displays an award.

16. The gaming machine in accordance with claim 12 wherein said electronic display graphically displays rotation of said wheel relative to said selector.

17. The gaming machine in accordance with claim 12 wherein said award comprises one or more of a numerical value, a number of credits, a jackpot, a number of free spins, a number of free spins and a monetary value.

18. The gaming machine in accordance with claim 12 wherein said transformation of the icon occurs prior to displaying relative movement of said wheel to said selector.

19. The gaming machine in accordance with claim 12 wherein said transformation of the icon occurs during said displaying relative movement of said wheel to said selector.

20. The gaming machine in accordance with claim 12 wherein the icon is transformed in at least one of the plurality of segments in response to the selection of a segment of said plurality of segments which displays said icon.

* * * * *